United States Patent
Kelley, Jr. et al.

(10) Patent No.: US 7,421,793 B2
(45) Date of Patent: *Sep. 9, 2008

(54) TILT SENSOR AND METHOD OF PROVIDING THE SAME

(75) Inventors: Whitmore B. Kelley, Jr., Enfield, NH (US); Brian Blades, Concord, NH (US)

(73) Assignee: SignalQuest, Inc., Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,343

(22) Filed: Jan. 20, 2006

(65) Prior Publication Data

US 2007/0169360 A1 Jul. 26, 2007

(51) Int. Cl.
*G01C 9/06* (2006.01)
*H01H 35/02* (2006.01)

(52) U.S. Cl. ............ 33/366.11; 33/366.26; 33/366.27; 200/61.45 R; 200/61.45 M

(58) Field of Classification Search ............ 33/366.11, 33/366.24–366.27, 363 L, 363 R, 391
See application file for complete search history.

(56) References Cited

U.S. PATENT DOCUMENTS

| | | | | |
|---|---|---|---|---|
| 1,393,312 A | * | 10/1921 | Perry | ............ 200/61.52 |
| 2,067,474 A | * | 1/1937 | Carbonara | ............ 33/365 |
| 4,980,575 A | * | 12/1990 | Schenkel | ............ 307/121 |
| 5,136,127 A | | 8/1992 | Blair | |
| 5,209,343 A | * | 5/1993 | Romano et al. | ............ 200/61.52 |
| 5,410,113 A | | 4/1995 | Mielke | |
| 5,672,856 A | * | 9/1997 | Kolb et al. | ............ 200/61.52 |
| 6,323,446 B1 | | 11/2001 | Schnell | |
| 6,348,665 B1 | | 2/2002 | Ohashi et al. | |
| 7,045,724 B1 | * | 5/2006 | Chou | ............ 200/61.45 R |
| 7,067,748 B1 | * | 6/2006 | Kelley, Jr. et al. | ..... 200/61.45 R |
| 7,326,866 B2 | * | 2/2008 | Kelley et al. | ............ 200/61.45 R |
| 7,326,867 B2 | * | 2/2008 | Kelley et al. | ............ 200/61.45 R |
| 2006/0157331 A1 | * | 7/2006 | Kelley et al. | ............ 200/61.45 R |
| 2006/0157332 A1 | * | 7/2006 | Kelley et al. | ............ 200/61.45 R |

* cited by examiner

*Primary Examiner*—G. Bradley Bennett
*Assistant Examiner*—Amy Cohen Johnson
(74) *Attorney, Agent, or Firm*—Peter A. Nieves; Sheehan, Phinney, Bass & Green, P.A.

(57) ABSTRACT

A tilt sensor contains a first electrically conductive element, a second electrically conductive element, an electrically insulative element, and a plurality of electrically conductive weights. The electrically insulative element is connected to the first electrically conductive element and the second electrically conductive element. In addition, the plurality of electrically conductive weights are located within a cavity of the tilt sensor, wherein the cavity is defined by at least one surface of the first electrically conductive element, at least one surface of the electrically insulative element, and at least one surface of the second electrically conductive element.

28 Claims, 14 Drawing Sheets

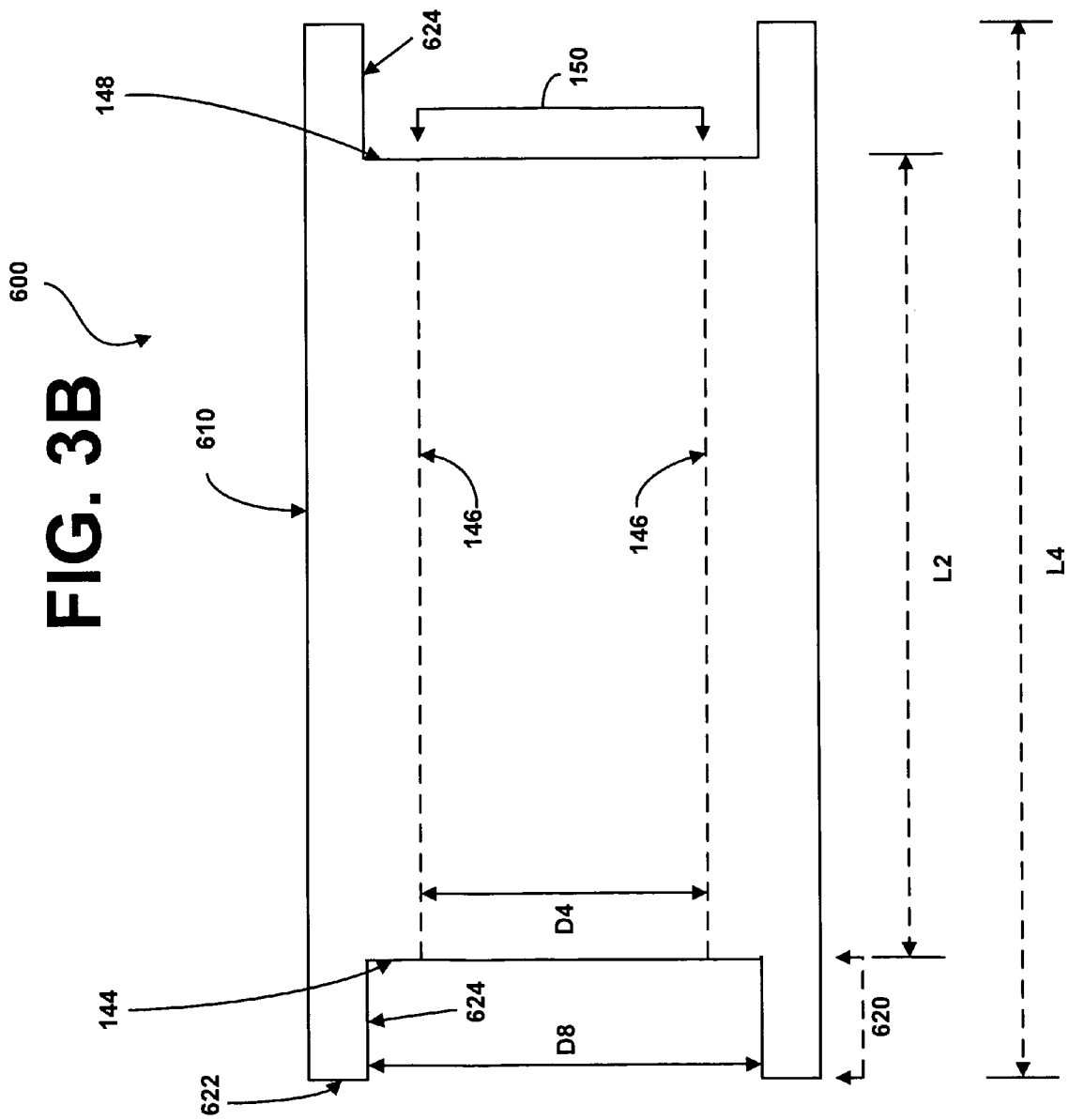

CLOSED

CLOSED

CLOSED

CLOSED

TILT SENSOR AND METHOD OF PROVIDING THE SAME

FIELD OF THE INVENTION

The present invention is generally related to sensors, and more particularly is related to a tilt sensor.

BACKGROUND OF THE INVENTION

Many different electrical tilt switches are presently available and known to those having ordinary skill in the art. Typically, tilt switches are used to switch electrical circuits ON and OFF depending on an angle of inclination of the tilt switch. These types of tilt switches typically contain a free moving conductive element located within the switch, where the conductive element contacts two terminals when the conductive element is moved into a specific position, thereby completing a conductive path. An example of this type of tilt switch is a mercury switch. Unfortunately, it has been proven that use of Mercury may lead to environmental concerns, thereby leading to regulation on Mercury use and increased cost of Mercury containing products, including switches.

To replace Mercury switches, newer switches use a conductive element capable of moving freely within a confined area. A popularly used conductive element is a single metallic ball. Tilt switches having a single metallic ball are capable of turning ON and OFF in accordance with a tilt angle of the tilt switch. Certain tilt switches also contain a ridge, a bump, or a recess, that prevents movement of the single metallic ball from a closed position (ON) to an open position (OFF) unless the tilt angle of the tilt switch is in excess of a predetermined angle.

An example of a tilt switch requiring exceeding of a tilt angle of the tilt switch is provided by U.S. Pat. No. 5,136,157, issued to Blair on Aug. 4, 1992 (hereafter, the '157 patent). The '157 patent discloses a tilt switch having a metallic ball and two conductive end pieces separated by a non-conductive element. The two conductive end pieces each have two support edges. A first support edge of the first conductive end piece and a first support edge of the second conductive end piece support the metallic ball there-between, thereby maintaining electrical communication between the first conductive end piece and the second conductive end piece. Maintaining electrical communication between the first conductive end piece and the second conductive end piece keeps the tilt switch in a closed state (ON). To change the tilt switch into an open state (OFF), the metallic ball is required to be moved so that the metallic ball is not connected to both the first conductive end piece and the second conductive end piece. Therefore, changing the tilt switch to an open state (OFF) requires tilting of the '157 patent tilt switch past a predefined tilt angle, thereby removing the metallic ball from location between the first and second conductive end piece. Unfortunately, tilt switches are generally constructed with a form factor that is difficult to attach to printed circuit boards using automated manufacturing equipment, and are costly to produce because of need to assemble numerous separate parts to form the switch.

Thus, a heretofore unaddressed need exists in the industry to address the aforementioned deficiencies and inadequacies.

SUMMARY OF THE INVENTION

Embodiments of the present invention provide a tilt sensor and a method of construction thereof. Briefly described, in architecture, one embodiment of the system, among others, can be implemented as follows. The tilt sensor contains a first electrically conductive element, a second electrically conductive element, an electrically insulative element, and a plurality of electrically conductive weights. The electrically insulative element is connected to the first electrically conductive element and the second electrically conductive element. In addition, the plurality of conductive weights are located within a cavity of the tilt sensor, wherein the cavity is defined by at least one surface of the first electrically conductive element, at least one surface of the electrically insulative element, and at least one surface of the second electrically conductive element.

The present invention can also be viewed as providing methods for assembling a tilt sensor having a first electrically conductive element, a second electrically conductive element, an electrically insulative element, and a plurality of electrically conductive weights. In this regard, one embodiment of such a method, among others, can broadly be summarized by the following steps: fitting a distal portion of the first electrically conductive element within a hollow center of the electrically insulative member; positioning the plurality of electrically conductive weights within the hollow center of the electrically insulative member; and fitting a distal portion of the second electrically conductive element within the hollow center of the electrically insulative member.

Other systems, methods, features, and advantages of the present invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3B is a cross-sectional side view of the central member of FIG. 1, in accordance with an alternative embodiment of the invention.

DETAILED DESCRIPTION

Figure 1:
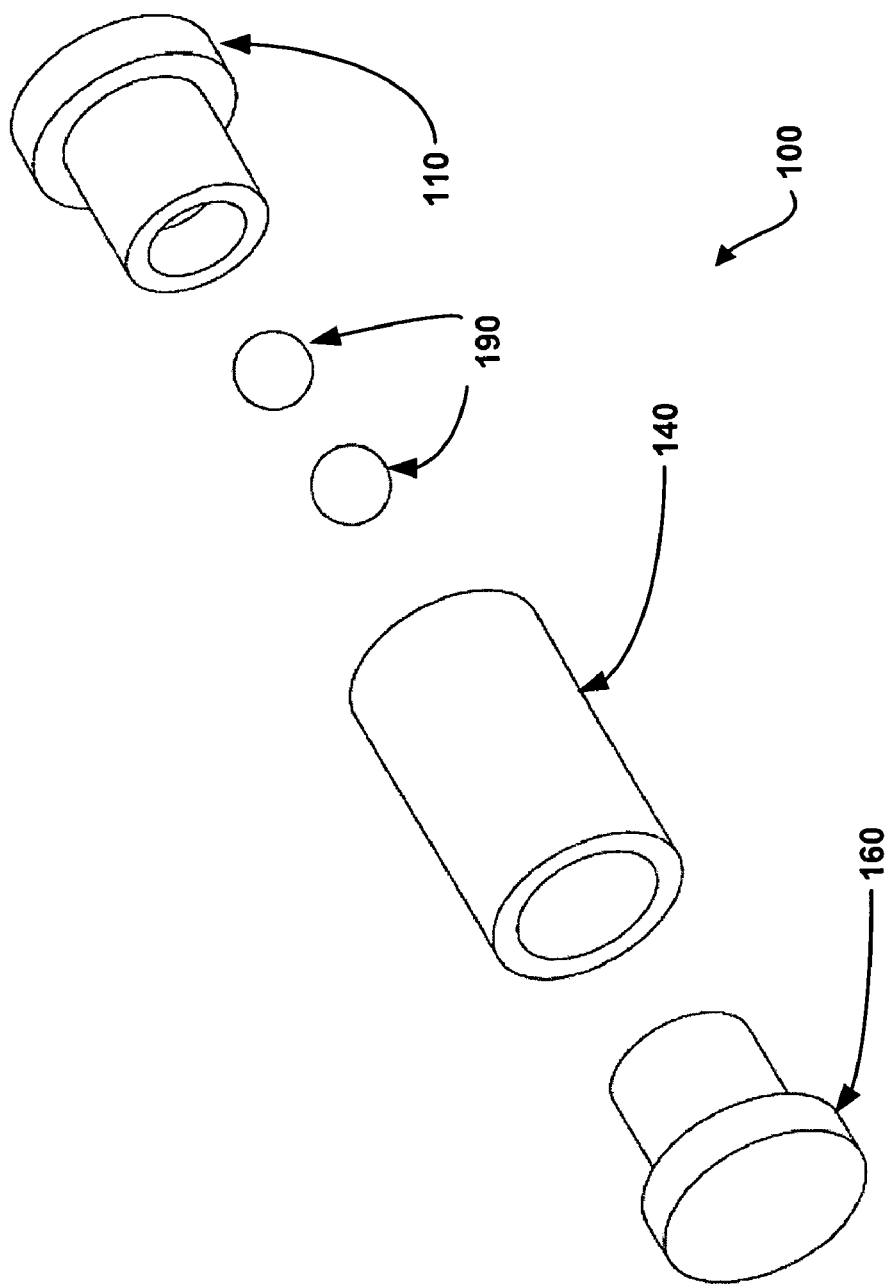
FIG. 1 is an exploded perspective side view of the present tilt sensor, in accordance with a first exemplary embodiment of the invention.

The following describes a tilt sensor. The tilt sensor contains a minimal number of cooperating parts to ensure ease of assembly and use. FIG. 1 is an exploded perspective side view of the present tilt sensor 100, in accordance with a first exemplary embodiment of the invention.

Referring to FIG. 1, the tilt sensor 100 contains a first end cap 110, a central member 140, a second end cap 160, and multiple weights embodied as a pair of conductive balls 190 that are spherical in shape (hereafter, conductive spheres). Specifically, the first end cap 110 is conductive and may be constructed from a composite of high conductivity and/or low reactivity metals, a conductive plastic, or any other conductive material.

Figure 2:
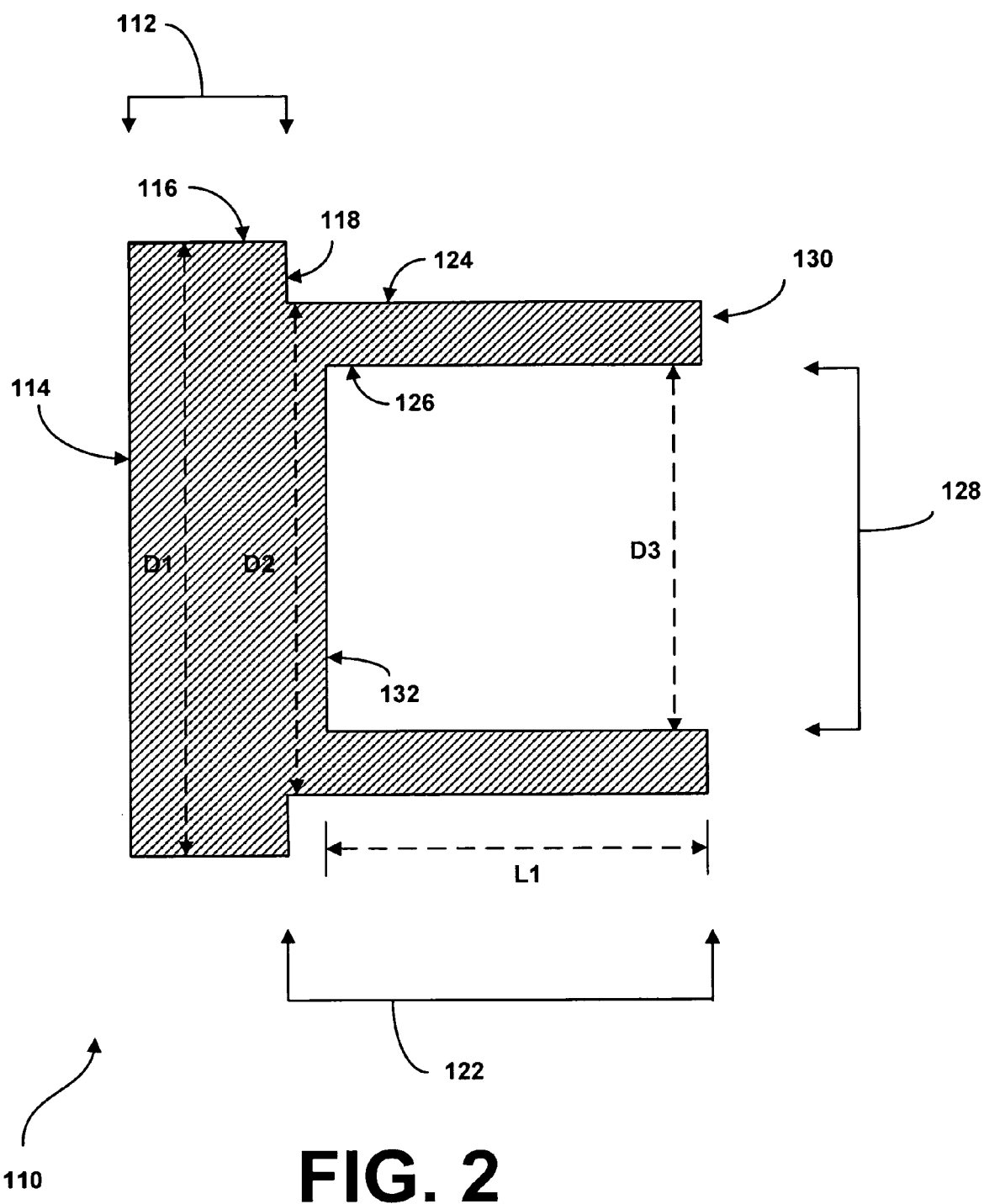
FIG. 2 is a cross-sectional side view of the first end cap of FIG. 1.

FIG. 2 is a cross-sectional side view of the first end cap 110, which may be referred to for a better understanding of the location of portions of the first end cap 110. The first end cap 110 has a proximate portion 112 and a distal portion 122. The proximate portion 112 of the first end cap 110 is circular, having a diameter D1, and having a flat end surface 114. A top surface 116 of the proximate portion 112 runs perpendicular to the flat end surface 114. A width of the top surface 116 is the same width as a width of the entire proximate portion 112 of the first end cap 110. The proximate portion 112 also contains an internal surface 118 located on a side of the proximate portion 112 that is opposite to the flat end surface 114, where the top surface 116 runs perpendicular to the internal surface 118. Therefore, the proximate portion 112 is in the shape of a disk. This disk shaped portion of the first end cap 110 is also referred to herein as a flange of the first end cap 110.

Figure 4:
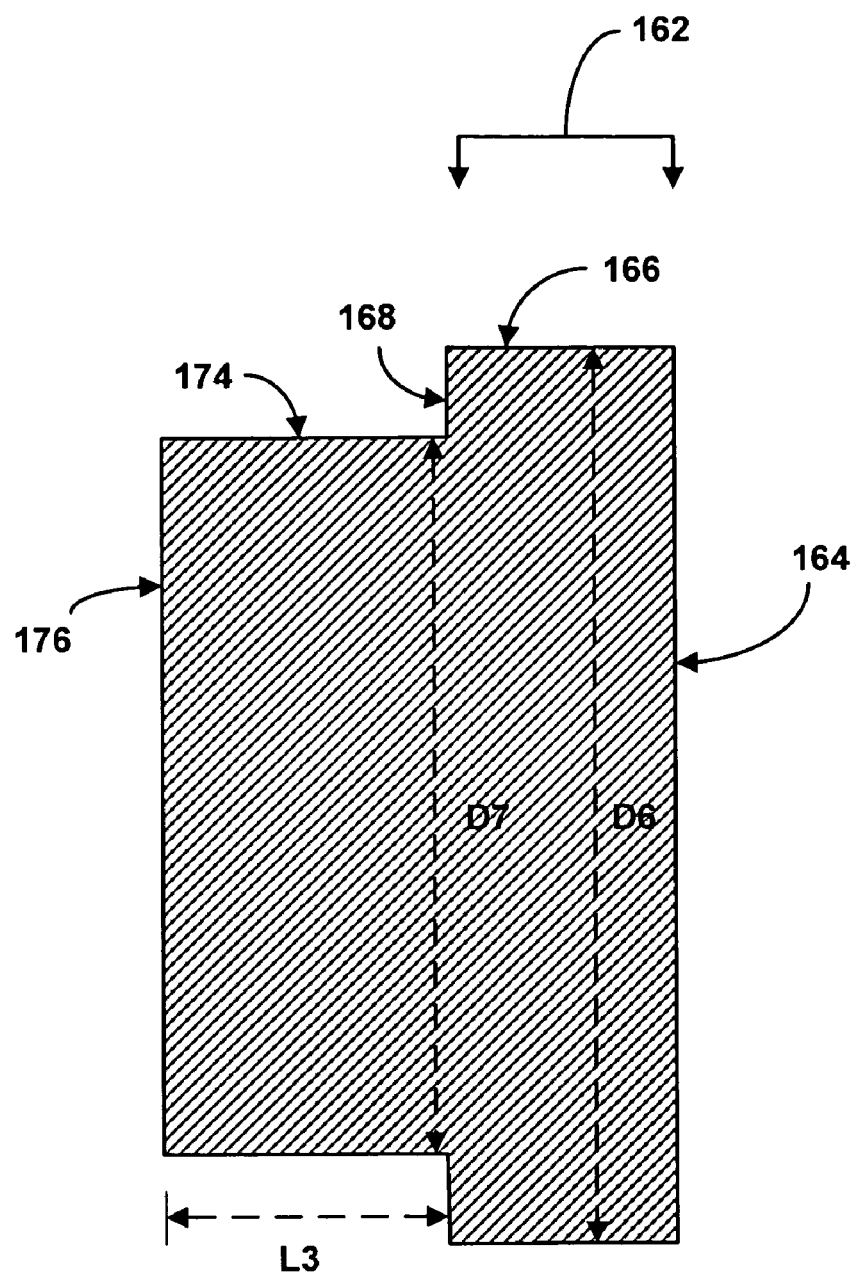
FIG. 4 is a cross-sectional side view of the second end cap of FIG. 1.

It should be noted that while FIG. 2 illustrates the proximate portion 112 of the first end cap 110 having a flat end surface 114, and FIG. 4 illustrates the proximate portion 162 (FIG. 4) of the second end cap 160 as having a flat surface 164 (FIG. 4), one having ordinary skill in the art would appreciate that the proximate portions 112, 162 (FIG. 4) do not require presence of a flat end surface. Instead, the flat end surfaces 114, 164 may be convex or concave. In addition, instead of being circular, the first end cap 110 and the second end cap 160 may be square-like in shape, or they may be a different shape. Use of circular end caps 110, 160 is merely provided for exemplary purposes. The main function of the end caps 110, 160 is to provide a conductive connection that allows an electrical charge introduced to the first end cap 110 to traverse the conductive spheres 190 and be received by the second end cap 160, therefore, many different shapes and sizes of end caps 110, 160 may be used as long as the conductive path is maintained.

The relationship between the top portion 116, the flat end surface 114, and the internal surface 118 described herein is provided for exemplary purposes. Alternatively, the flat end surface 114 and the internal surface 118 may have rounded or otherwise contoured ends resulting in the top surface 116 of the proximate portion 112 being a natural rounded progression of the end surface 114 and the internal surface 118.

The distal portion 122 of the first end cap 110 is tube-like in shape, having a diameter D2 that is smaller than the diameter D1 of the proximate portion 112. The distal portion 122 of the first end cap 10 contains a top surface 124 and a bottom surface 126. The bottom surface 126 of the distal portion 122 defines an exterior portion of a cylindrical gap 128 located central to the distal portion 122 of the first end cap 110. A diameter D3 of the cylindrical gap 128 is smaller than the diameter D2 of the distal portion 122.

Progression from the proximate portion 112 of the first end cap 110 to the distal portion 122 of the first end cap 110 is defined by a step where a top portion of the step is defined by the top surface 116 of the proximate portion 112, a middle portion of the step is defined by the internal surface 118 of the proximate portion 112, and a bottom portion of the step is defined by the top surface 124 of the distal portion 122.

The distal portion 122 of the first end cap 110 also contains an outer surface 130 that joins the top surface 124 and the bottom surface 126. It should be noted that while FIG. 2 shows the cross-section of the outer surface 130 as being squared to the top surface 124 and the bottom surface 126, the outer surface 130 may instead be rounded or of a different shape.

As is better shown by FIG. 2, the distal portion 122 of the first end cap 110 is an extension of the proximate portion 112 of the first end cap 110. In addition, the top surface 124, the outer surface 130, and the bottom surface 126 of the distal portion 122 form a cylindrical lip of the first end cap 110. As is also shown by FIG. 2, the distal portion 122 of the first end cap 110 also contains an inner surface 132, the diameter of which is equal to or smaller than the diameter D3 of the cylindrical gap 128. While FIG. 2 illustrates the inner surface 132 as running parallel to the flat end surface 114, as is noted hereafter, the inner surface 132 may instead be concave, conical, or hemispherical. A length LI of the cylindrical gap 128 extends from the inner surface 132 of the first end cap 110 to the outer surface 130 of the first end cap 110.

It should be noted that the length L1 of the cylindrical gap 128 may differ, as long as a central cavity (200) of the tilt sensor 100 is long enough to fit the conductive spheres 190 therein without having the conductive spheres 190 touching both the first end cap 110 and the second end cap 160 at the same time.

Figure 3A:
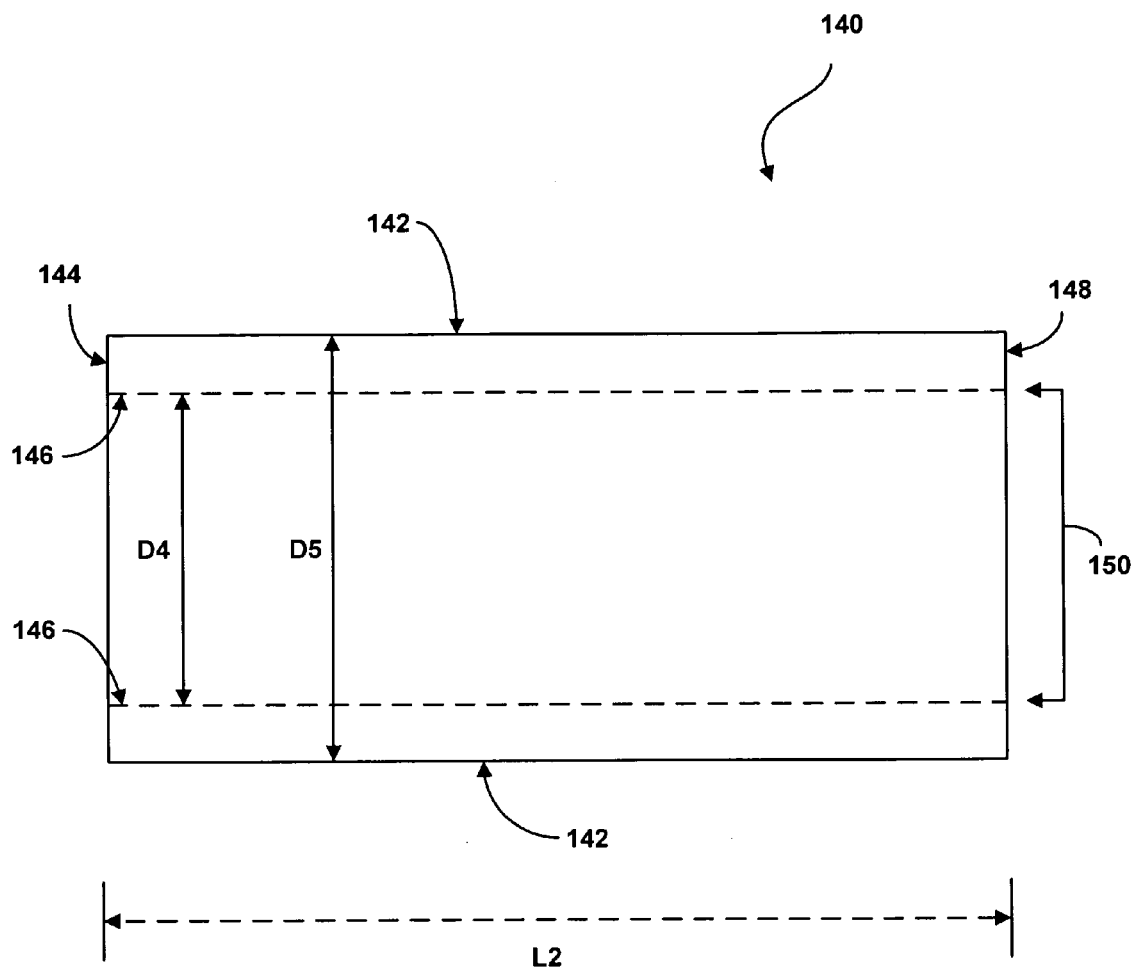
FIG. 3A is a cross-sectional side view of the central member of FIG. 1, in accordance with the first exemplary embodiment of the invention.

Referring to FIG. 1 and FIG. 3A, the central member 140 of the sensor 100 is tube-like in shape, having a top surface 142, a proximate surface 144, a bottom surface 146, and a distal surface 148. FIG. 3A is a cross-sectional side view of the central member 140 and may also be referred to for a better understanding of the location of portions of the central member 140. It should be noted that the central member 140 need not be tube-like in shape. Alternatively, the central member 140 may have a different shape, such as, but not limited to, that of a rectangle.

The bottom surface 146 of the central member 140 defines a hollow center 150 having a diameter D4 that is just slightly larger than the diameter D2 (FIG. 2), thereby allowing the distal portion 122 of the first end cap 110 to fit within the hollow center 150 of the central member 140 (FIG. 3A). In addition, the top surface 142 of the central member 140 defines the outer surface of the central member 140 where the central member 140 has a diameter D5. It should be noted that the diameter D1 (i. e., the diameter of the proximate portion 112 of the first end cap 110) is preferably slightly larger than diameter D5 (i.e., the diameter of the central member 140). Of course, different dimensions of the central member 140 and end caps 110, 160 may also be provided. In addition, when the tilt sensor 100 is assembled, the proximate surface 144 of the central member 140 rests against the internal surface 118 of the first end cap 110.

Unlike the first end cap 110 and the second end cap 160, the central member 140 is not electrically conductive. As an example, the central member 140 may be made of plastic, glass, or any other nonconductive material. In an alternative embodiment of the invention, the central member 140 may also be constructed of a material having a high melting point that is above that used by commonly used soldering materials. As is further explained in detail below, having the central member 140 non-conductive ensures that the electrical conductivity provided by the sensor 100 is provided through use of the conductive spheres 190. Specifically, location of the central member 140 between the first end cap 110 and the second end cap 160 provides a non-conductive gap between the first end cap 110 and the second end cap 160.

A length L2 of the hollow center 150 extends from the proximate surface 144 of the central member 140 to the distal surface 148 of the central member 140. It should be noted that the length L1 of the cylindrical gap 128 is smaller than the length L2 of the hollow center 150.

FIG. 3B is a cross-sectional side view of the central member of FIG. 3A, in accordance with an alternative embodiment of the invention, where the central member 600 contains a top surface 610 and an outer lip 620. A top portion of the outer lip 620 is the top surface 610. The outer lip 620 also contains an outer lip end surface 622 and an outer lip bottom surface 624, where the outer lip bottom surface 624 is perpendicular to the outer lip end surface 622. Of course, the outer lip bottom surface 624 is not required to be perpendicular to the outer lip end surface 622. Similar to the central member of FIG. 3A, the central member 600 of FIG. 3B contains a proximate surface 144, a bottom surface 146, a distal surface 148, and a hollow center 150.

The top surface 610 of the central member 600 has a length L4, while a length L2 of the hollow center 150 extends from the proximate surface 144 of the central member 600 to the distal surface 148 of the central member 600. The outer lip end surface 622 extends a distance ½ (L4−L2) from either the proximate surface 144 or from the distal surface 148 of the central member 600. The distance ½ (L4−L2) is the same or larger than the width of the top surface 116 of the proximate portion 112 of the first end cap 110, thereby having the first end cap 110 and the second end cap 160 within the central member 600.

As in the central member 140 of FIG. 3A, the bottom surface 146 of the central member 600 of FIG. 3B defines the hollow center 150 having the diameter D4 that is just slightly larger than the diameter D2 (FIG. 2), thereby allowing the distal portion 122 of the first end cap 110 to fit within the hollow center 150 of the central member 600. In addition, the distance between the bottom lip surface 624 of the central member 600 defines a diameter D8. It should be noted that the diameter D1 (i.e., the diameter of the proximate portion 112 of the first end cap 110) is preferably slightly smaller than diameter D8. In addition, a diameter D6 (i. e., a diameter of the proximate portion 162 of the second end cap 160) is preferably slightly smaller than diameter D8. Of course, different dimensions of the central member 600 and end caps 110, 160 may also be provided. In addition, when the tilt sensor 100 is assembled, the proximate surface 144 of the central member 600 rests against the internal surface 118 of the first end cap 110, and the bottom lip surface 624 of the central member 600 rests against the top surface 116 of the proximate portion 112. Further, when the tilt sensor 100 is assembled, the distal surface 148 of the central member 600 rests against an internal surface 168 of the second end cap 160, and the bottom lip surface 624 of the central member 600 rests against the top surface 166 of the proximate portion 162.

Referring to FIG. 1 and FIG. 4, the second end cap 160 is conductive, having a proximate portion 162 and a distal portion 172. Specifically, the second end cap 160 may be constructed from a composite of high conductivity and/or low reactivity metals, a conductive plastic, or any other conductive material.

FIG. 4 is a cross-sectional side view of the second end cap 160, which may be referred to for a better understanding of the location of portions of the second end cap 160. The proximate portion 162 of the second end cap 160 is circular, having a diameter D6, and having a flat end surface 164. A top surface 166 of the proximate portion 162 runs perpendicular to the flat end surface 164. A width of the top surface 166 is the same width as a width of the entire proximate portion 162 of the second end cap 160. The proximate portion 162 also contains an internal surface 168 located on a side of the proximate portion 162 that is opposite to the flat end surface 164, where the top surface 166 runs perpendicular to the internal surface 168. Therefore, the proximate portion 162 is in the shape of a disk. This disk shaped portion of the second end cap 160 is also referred to herein as a flange of the second end cap 160.

The relationship between the top portion 166, the flat end surface 164, and the internal surface 168 described herein is provided for exemplary purposes. Alternatively, the flat end surface 164 and the internal surface 168 may have rounded or otherwise contoured ends resulting in the top surface 166 of the proximate portion 162 being a natural rounded progression of the end surface 164 and the internal surface 168.

The distal portion 172 of the second end cap 160 is also disk-like in shape, having a diameter D7 that is smaller than the diameter D6 of the proximate portion 162. The distal portion 172 of the second end cap 160 contains a top surface 174 and an outer surface 176. In addition, the distal portion 172 of the second end cap 160 has a length L3, where the length L3 of the distal portion 172 is smaller than the length L2 of the hollow center 150 of the central member 140. In fact, as is shown hereinafter with regard to FIGS. 2-4, the length L2 of the hollow center 150 is larger than the combination of the length L3 of the distal portion 172 of the second end cap 160 combined with the length L1 of the cylindrical gap 128 of the first end cap 110.

It should be noted that, while the outer surface 176 of the distal portion 172 is shown as being flat, one having ordinary skills in the art would appreciate that the outer surface 176 need not be flat. Progression from the proximate portion 162 of the second end cap 160 to the distal portion 172 of the second end cap 160 is defined by a step where a top portion of the step is defined by the top surface 166 of the proximate portion 162, a middle portion of the step is defined by the internal surface 168 of the proximate portion 162, and a bottom portion of the step is defined by the top surface 174 of the distal portion 172.

Within the distal portion 172 of the second end cap 160, the outer surface 176 joins the top surface 174. It should be noted that while FIG. 4 shows the cross-section of the outer surface 176 as being squared to the top surface 174, the outer surface 176 may instead be rounded or of a different shape. Referring to FIG. 4, the distal portion 172 of the second end cap 160 is shown to be an extension of the proximate portion 162 of the second end cap 160. It should be noted that while FIG. 4 illustrates the outer surface 176 as running parallel to the flat end surface 164, the outer surface 176 may instead be concave, conical, or hemispherical.

It should be noted that dimensions of the second end cap 160 are preferably similar to the dimensions of the first end cap 110. Therefore, the diameter D4 of the central member 140 hollow center 150 is also just slightly larger that the diameter D7 of the second end cap 160, thereby allowing the distal portion 172 of the second end cap 160 to fit within the hollow center 150 of the central member 140. In addition, the diameter D6 (i.e., the diameter of the proximate portion 162 of the second end cap 160) is preferably slightly larger that diameter D5 (i.e., the diameter of the central member 140). Further, when the tilt sensor 100 is assembled, the distal surface 148 of the central member 140 rests against the internal surface 168 of the second end cap 160.

Referring to FIG. 1, when the tilt sensor 100 is assembled, the pair of conductive spheres 190 (also referred to as conductive weights), including a first conductive sphere 192 and a second conductive sphere 194, fit within the central member 140, within a portion of the cylindrical gap 128 of the first distal portion 122 of the first end cap 110, and a space provided between the outer surface 130 of the first end cap 110 and the outer surface 176 of the second end cap 110.

Specifically, the inner surface 132, bottom surface 126, and outer surface 130 of the first end cap 110, the bottom surface 146 of the central member 140, and the outer surface 176 of the second end cap 160 form a central cavity 200 of the tilt sensor 100, where the pair of conductive spheres 190 are confined.

Further illustration of location of the conductive spheres 190 is provided and illustrated with regard to FIG. 6A and FIG. 6B, and FIGS. 7A-7E. It should be noted that, while the figures in the present disclosure illustrate both of the conductive spheres 190 as being substantially symmetrical, alternatively, one sphere may be larger than the other sphere. Specifically, as long as the conductive relationships described herein are maintained, the conductive relationships may be maintained by both spheres being larger, one sphere being larger than the other, both spheres being smaller, or one sphere being smaller. It should be noted that the conductive spheres 190 may instead be in the shape of ovals, cylinders, or any other shape that permits motion within the central cavity 200 in a manner similar to that described herein.

Figure 5:
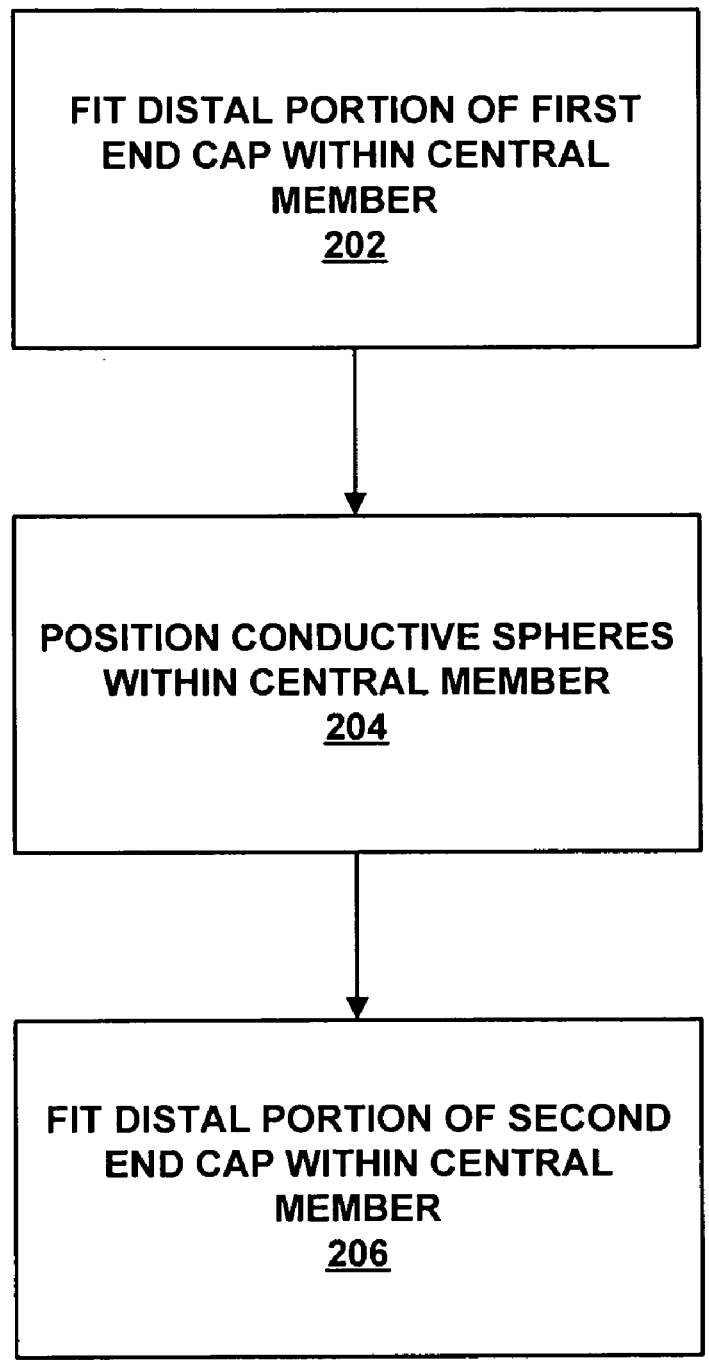
FIG. 5 is a flowchart illustrating a method of assembling the tilt sensor of FIG. 1.

Due to minimal components, assembly of the sensor 100 is quite simplistic. Specifically, there are four components, namely, the first end cap 110, the central member 140, the conductive spheres 190, and the second end cap 160. FIG. 5 is a flowchart illustrating a method of assembling the tilt sensor 100 of FIG. 1. It should be noted that any process descriptions or blocks in flowcharts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, the distal portion 122 of the first end cap 110 is fitted within the hollow center 150 of the central member 140 so that the proximate surface 144 of the central member 140 is adjacent to or touching the internal surface 118 of the first end cap 110. The conductive spheres 190 are then positioned within the hollow center 150 of the central member 140 and within a portion of the cylindrical gap 128 (block 204). The distal portion 172 of the second end cap 160 is then fitted within the hollow center 150 of the central member 140, so that the distal surface 148 of the central member 140 is adjacent to or touching the internal surface 168 of the second end cap 160 (block 206).

When assembled, the inner surface 132, bottom surface 126, and outer surface 130 of the first end cap 110, the bottom surface 146 of the central member 140, and the outer surface 176 of the second end cap 160 form the central cavity 200 of the tilt sensor 100 where the pair of conductive spheres 190 are confined.

In accordance with an alternative embodiment of the invention, the tilt sensor 100 may be assembled in an inert gas, thereby creating an inert environment within the central cavity 200, thereby reducing the likelihood that the conductive spheres 190 will oxidize. As is known by those having ordinary skill in the art, oxidizing of the conductive spheres 190 would lead to a decrease in the conductive properties of the conductive spheres 190. In addition, in accordance with another alternative embodiment of the invention, the first end cap 110, the central member 140, and the second end cap 160 may be joined by a seal, thereby preventing any contaminant from entering the central cavity 200.

Figure 6A:
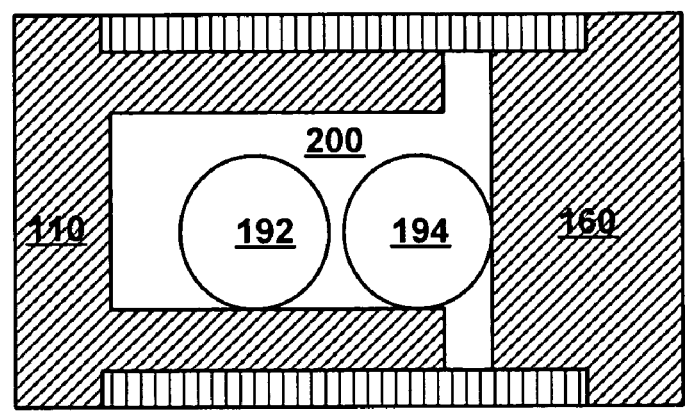
FIG. 6A and FIG. 6B are cross-sectional side views of the tilt sensor of FIG. 1 in a closed state (ON), in accordance with the first exemplary embodiment of the invention.
Figure 6B:
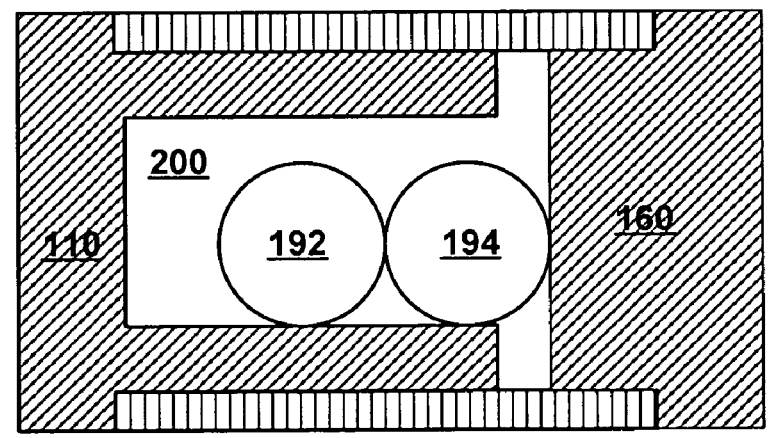

The sensor 100 has the capability of being in a closed state (ON) or an open state (OFF), depending on location of the conductive spheres 190 within the central cavity 200 of the tilt sensor 100. FIG. 6A and FIG. 6B are cross-sectional views of the tilt sensor 100 of FIG. 1 in a closed state (ON), in accordance with the first exemplary embodiment of the invention. In order for the tilt sensor 100 to be maintained in a closed state (ON), an electrical charge introduced to the first end cap 110 is required to traverse at least one conductive sphere 192, 194 and be received by the second end cap 160. For this reason, it should be noted that in accordance with an alternative embodiment of the invention, the tilt sensor 100 may also only contain a single conductive sphere 190 (FIG. 6D).

Referring to FIGS. 6A and 6B, the tilt sensor 100 is in a closed state (ON) because the second conductive sphere 194 is touching the bottom surface 126 of the first end cap 110 and the second conductive sphere 194 is touching the outer surface 176 of the second end cap 160, thereby providing a conductive path from the first end cap 110, through the second conductive sphere 194, to the second end cap 160.

Figure 6C:
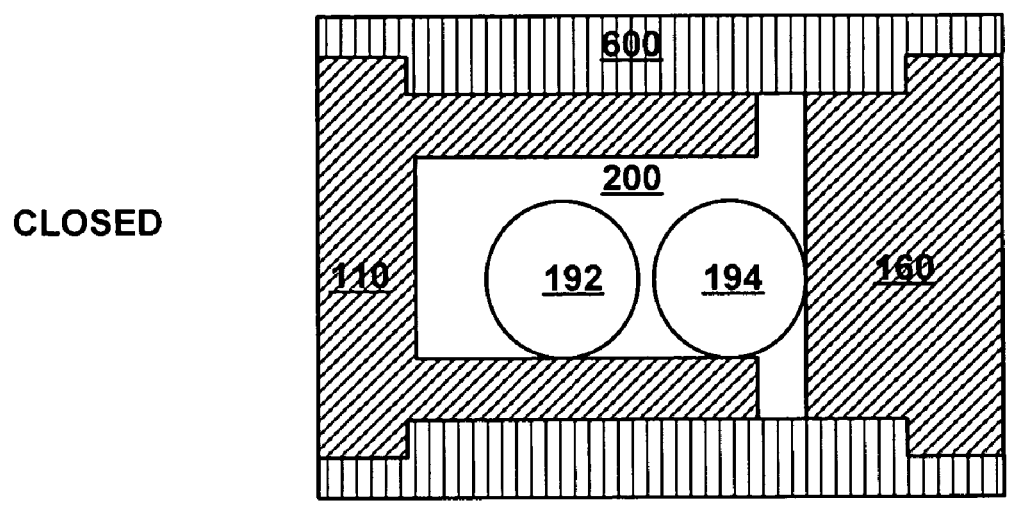
FIG. 6C is a cross-sectional side view of the tilt sensor having the central member of FIG. 3B.
Figure 6D:
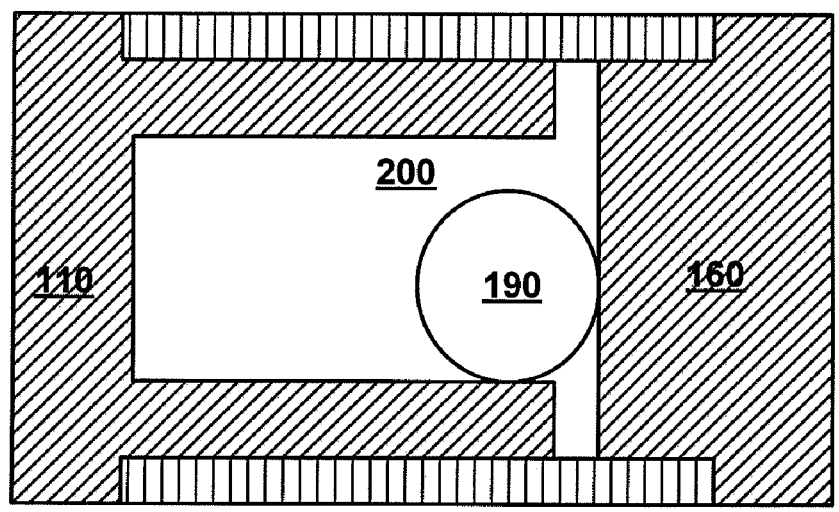
FIG. 6D is a cross-sectional side view of the tilt sensor of FIG. 1 having a single conductive sphere, in accordance with an alternative embodiment of the invention.

FIG. 6C is a cross-sectional side view of the tilt sensor 100 having the central member 610 of FIG. 3B. As shown, the tilt sensor 100 of FIG. 6C is in a closed state (ON).

It should be noted that in accordance with the first exemplary embodiment of the invention, a distance between the first end cap 110 and the second end cap 160 (also referred to herein as a "gap"), when the tilt sensor 100 is assembled, is not so large as to allow the second conductive sphere 194 to fall therein. As a result of the gap not being too large, the tilt sensor 100 is very sensitive and allows for changing states from a closed state (ON) to an open state (OFF), or from an open state (OFF) to a closed state (ON), with slight tilting of the tilt sensor 100.

Figure 6E:
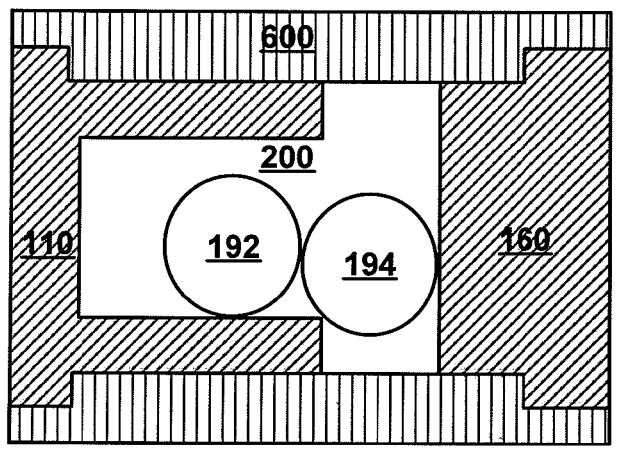
FIG. 6E is a cross-sectional side view of the tilt sensor of FIG. 1 having a gap between the first end cap and the second end cap.
Figure 7A:
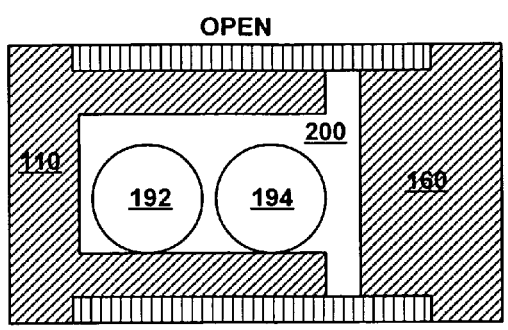
FIGS. 7A, 7B, 7C, and 7D are cross-sectional side views of the tilt sensor of FIG. 1 in an open state (OFF), in accordance with the first exemplary embodiment of the invention.
Figure 7B:
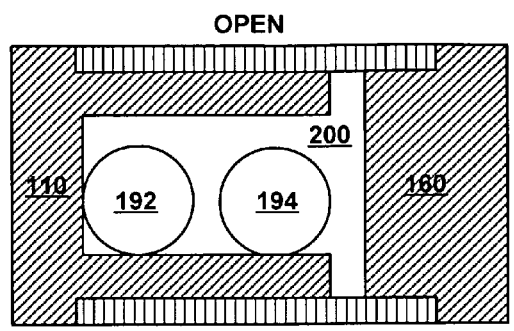
Figure 7C:
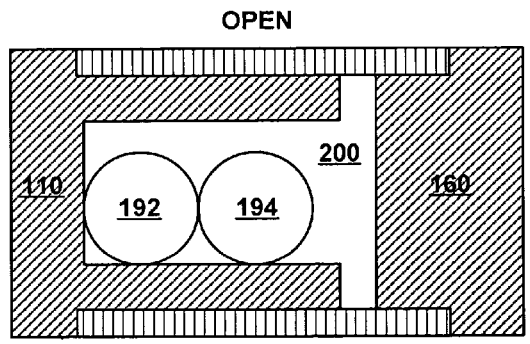
Figure 7D:
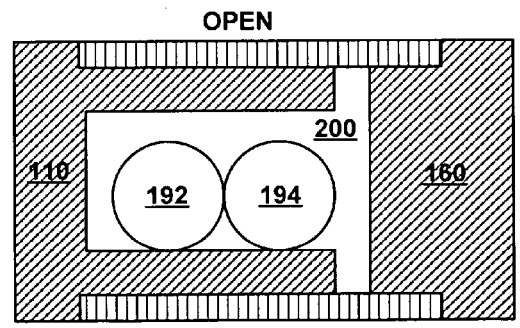

In accordance with a second exemplary embodiment of the invention, as shown by FIG. 6E the distance between the first end cap 110 and the second end cap 160 is large enough to allow the second conductive sphere 194 to rest within a gap created by the distance. It should be noted that, in accordance with the second exemplary embodiment of the invention, the gap is not large enough that the second conductive sphere 194 would be difficult to dislodge from the gap. Instead, the size of the gap dictates the angle of tilt required to allow the second conductive sphere 194 to move out of the gap, thereby making changing states of the tilt sensor 100 from a closed state (ON) to an open state (OFF) more difficult in the tilt sensor 100 of the second exemplary embodiment than in the tilt sensor 100 of the first exemplary embodiment of the invention.

FIG. 7A-FIG. 7D are cross-sectional views of the sensor 100 of FIG. 1 in an open state (OFF), in accordance with the first exemplary embodiment of the invention. In order for the tilt sensor 100 to be maintained in an open state (OFF), an electrical charge introduced to the first end cap 110 cannot traverse the second conductive sphere 194 and be received by the second end cap 160. Referring to FIGS. 7A-7D, each of the tilt sensors 100 displayed are in an open state (OFF) because the second conductive sphere 194 is not in contact with the second end cap 160. Of course, other arrangements of the first and second conductive spheres 192, 194 within the central cavity 200 of the tilt sensor 100 may be provided as long as no conductive path is provided from the first end cap 110 to the second conductive sphere 194, to the second end cap 160.

Figure 8:
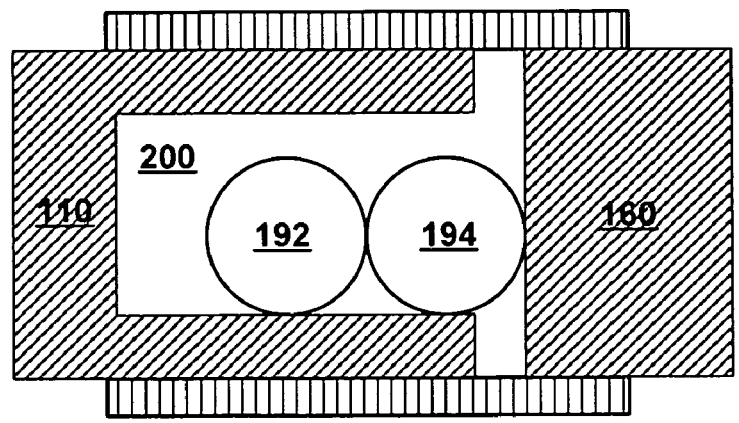
FIG. 8 is a cross-sectional side view of a tilt sensor, in accordance with a third exemplary embodiment of the invention.

FIG. 8 is a cross-sectional side view of the present tilt sensor 300, in accordance with a third exemplary embodiment of the invention. The tilt sensor 300 of the third exemplary embodiment of the invention does not contain a flange on the first end cap 110 or a flange on the second end cap 160.

Figure 9:
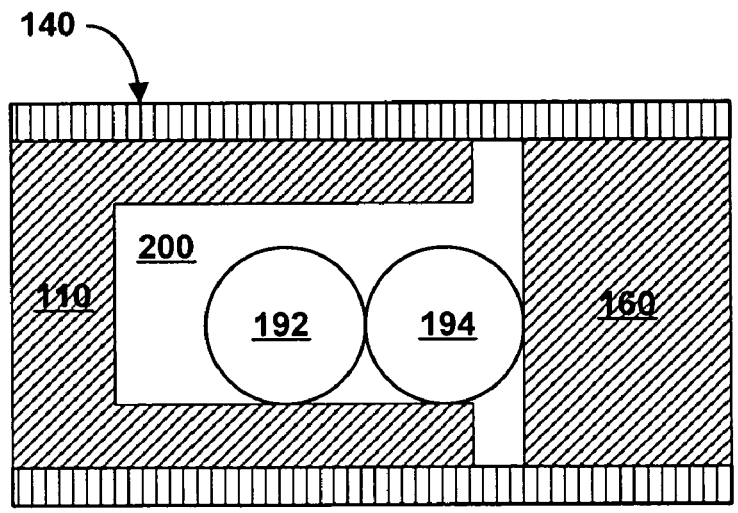
FIG. 9 is a cross-sectional side view of a tilt sensor, in accordance with a fourth exemplary embodiment of the invention.

FIG. 9 is a cross-sectional side view of the present tilt sensor 400, in accordance with a fourth exemplary embodiment of the invention. The tilt sensor 400 of the fourth exemplary embodiment of the invention does not contain a flange on the first end cap 110 or a flange on the second end cap 160. In addition, the central member 140 extends over the proximate portion 112 and a distal portion 122 of the first end cap 110, and over the proximate portion 162 and a distal portion 172 of the second end cap 160.

Figure 10:
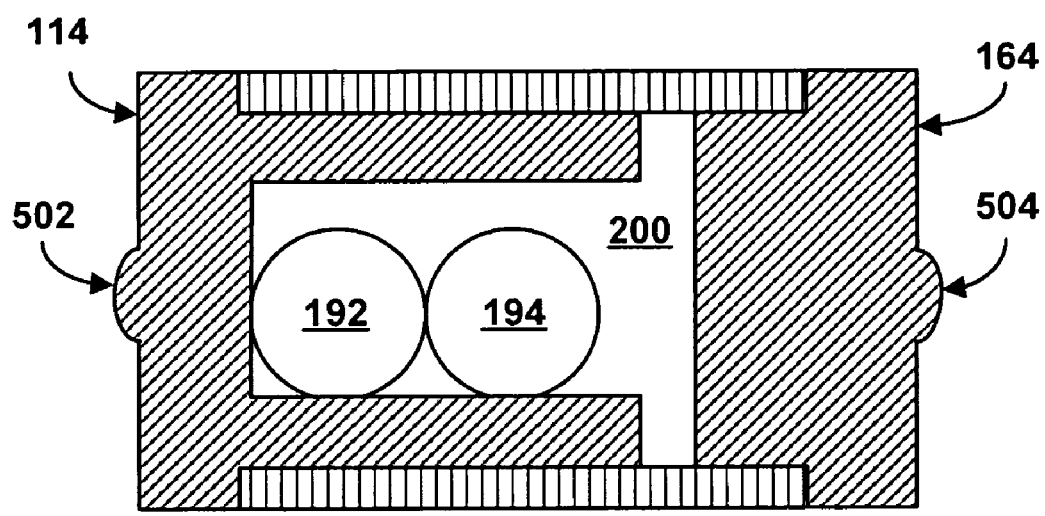
FIG. 10 is a cross-sectional side view of a tilt sensor, in accordance with a fifth exemplary embodiment of the invention.

FIG. 10 is a cross-sectional side view of the present tilt sensor 500, in accordance with a fifth exemplary embodiment of the invention. The tilt sensor 500 of the fifth exemplary embodiment of the invention contains a first nub 502 located on the flat end surface 114 of the first end cap 110 and a second nub 504 located on a flat end surface 164 of the second end cap 160. The nubs 502, 504 provide a conductive mechanism for allowing the tilt sensor 500 to connect to a printed circuit board (PCB) landing pad, where the PCB landing pad has an opening cut into it allowing the tilt sensor 500 to recess into the opening. Specifically, dimensions of the tilt sensor 500 may be selected so as to allow the tilt sensor 500 to fit within a landing pad of a PCB. Within the landing pad there may be a first terminal and a second terminal. By using the nubs 502, 504, fitting the tilt sensor 500 into landing pad may press the first nub 502 against the first terminal and the second nub 504 against the second terminal. Those having ordinary skill in the art would understand the basic structure of a PCB landing pad, therefore, further explanation of the landing pad is not provided herein.

It should be noted that the tilt sensors described herein may have the same basic shape, thereby contributing to ease of preparing a printed circuit board (PCB) for receiving the tilt sensor. Specifically, a hole may be cut in a PCB the size of the tilt sensor (i.e., the size of the first and second end caps 110, 160 and the central member 140) so that the tilt sensor can drop into the hole, where the tilt sensor is prevented from falling through the hole when caught by the nubs 502, 504 that land on connection pads. In the exemplary embodiments of the invention where there are no nubs 502, 504, the end caps may be directly mounted to the PCB.

In accordance with another alternative embodiment of the invention, the two conductive spheres may be replaced by more than two conductive spheres, or other shapes that are easily inclined to roll when the sensor 100 is moved.

Figure 11A:
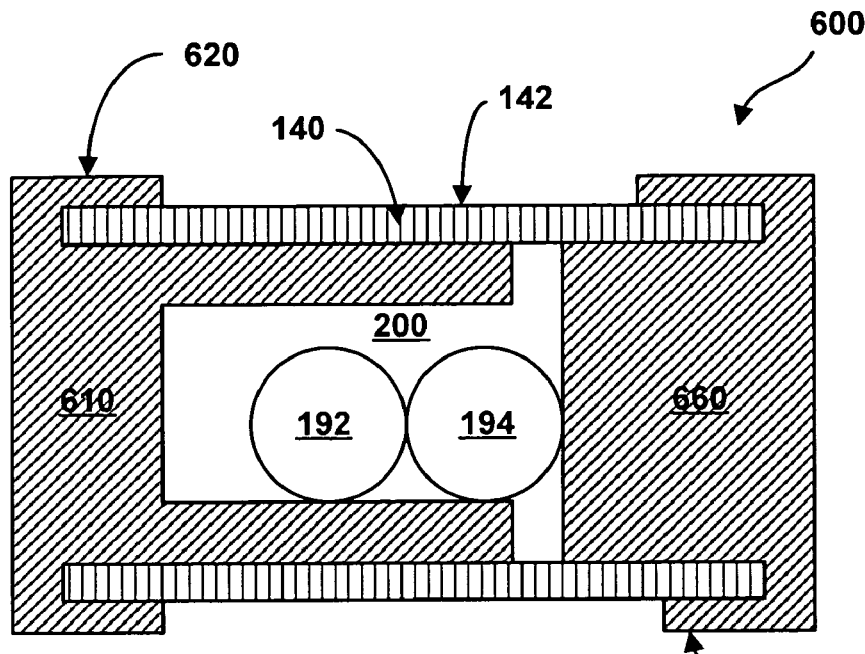
FIG. 11A and FIG. 11B are cross-sectional side views of a tilt sensor, in accordance with a sixth exemplary embodiment of the invention.
Figure 11B:
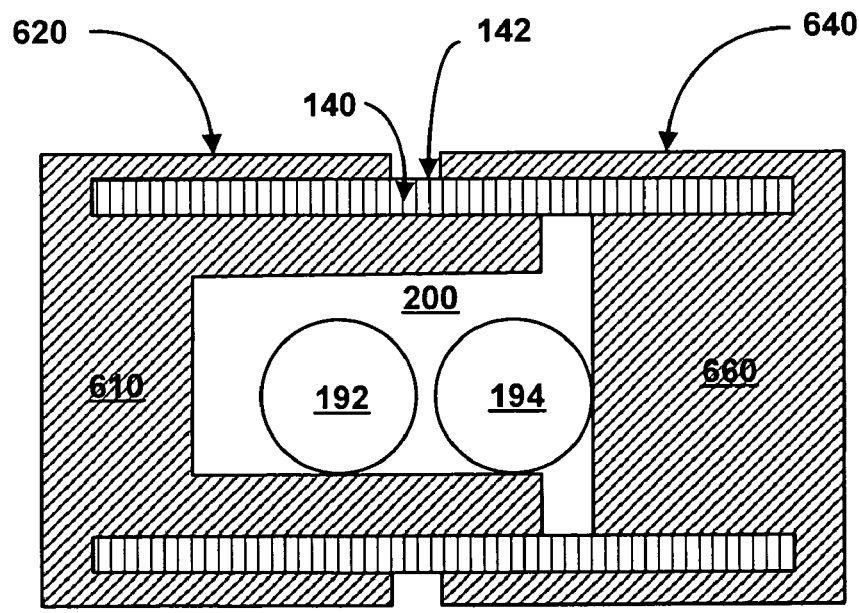

FIG. 11A and FIG. 11B are cross-sectional side views of a tilt sensor 600, in accordance with a sixth exemplary embodiment of the invention. As is show by FIGS. 11A and 11B, the first and second end caps 610, 660 have a top lip portion that overlaps a portion of the central member 140. The embodiment of the central member 140 illustrated by FIG. 11A and FIG. 11B is the central member 140 of FIG. 3A.

The first end cap 610 contains a first top lip portion 620 that overlaps the top surface 142 of the central member 140. The first top lip portion 620 of the first end cap 610 is shown to overlap the top surface 142 of the central member 140 more in the embodiment of FIG. 11B than in the embodiment of FIG. 11A. The second end cap 630 contains a second top lip portion 640 that overlaps the top surface 142 of the central member 140. The first top lip portion 620 and the second top lip portion 640 form a cavity in which the central member 140 fits when assembling the tilt sensor 600.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A tilt sensor, comprising:
a first electrically conductive element, having a first diameter on a proximate portion of the first electrically conductive element and a second diameter on a distal portion of the first electrically conductive element, where the second diameter of the first electrically conductive element is smaller than the first diameter of the first electrically conductive element;
a second electrically conductive element, having a first diameter on a proximate portion of the second electrically conductive element and a second diameter on a distal portion of the second electrically conductive element, where the second diameter of the second electrically conductive element is smaller than the first diameter of the second electrically conductive element, wherein the distal portion of the first electrically conductive element faces the distal portion of the second electrically conductive element;
an electrically insulative element connected to the first electrically conductive element and the second electrically conductive element; and
a plurality of electrically conductive weights located within a cavity of the tilt sensor, wherein the cavity is defined by at least one surface of the first electrically conductive element, at least one surface of the electrically insulative element, and at least one surface of the second electrically conductive element,
wherein the distal portion of the first electrically conductive element is separated from the distal portion of the second electrically conductive element by a gap, and wherein none of the electrically conductive weights is capable of falling into the gap.

2. The tilt sensor of claim 1, wherein the tilt sensor is in a closed state (ON) if a conductive path exists from the first electrically conductive element, through at least one of the plurality of electrically conductive weights, through the second electrically conductive element, and wherein the tilt sensor is in an open state (OFF) if there is no conductive path from the first electrically conductive element, through at least one of the plurality of electrically conductive weights, through the second electrically conductive element.

3. The tilt sensor of claim 1, wherein the first electrically conductive element is sealed to the electrically insulative element and the second electrically conductive element is sealed to the electrically insulative element.

4. The tilt sensor of claim 1, wherein the tilt sensor is further defined by:
the first electrically conductive element further comprises a flat end surface located on a side opposite the distal portion of the first electrically conductive element; and
wherein the second electrically conductive element further comprises a flat end surface located on a side opposite the distal portion of the second electrically conductive element.

5. The tilt sensor of claim 4, wherein the flat end surface of the first electrically conductive element contains a first nub for providing electrical contact of the first electrically conductive element to a first terminal, and wherein the flat end surface of the second electrically conductive element contains a second nub for providing electrical contact of the second electrically conductive element to a second terminal.

6. The tilt sensor of claim 4, wherein the cavity is filled with an inert gas.

7. The tilt sensor of claim 1, wherein the diameter of the distal portion of the first electrically conductive element and the diameter of the distal portion of the second electrically conductive element are smaller than a diameter of the electrically insulative element.

8. The tilt sensor of claim 1, wherein the distal portion of the first electrically conductive element is longer than the distal portion of the second electrically conductive element.

9. The tilt sensor of claim 1:
wherein the distal portion of the first electrically conductive element fits within a proximate end of the electrically insulative element, and
wherein the distal portion of the second electrically conductive element fits within a distal end of the electrically insulative element.

10. The tilt sensor of claim 9, wherein the proximate portion of the first electrically conductive element and the proximate portion of the second electrically conductive element are located external to the electrically insulative element.

11. The tilt sensor of claim 9, further defined by:
the proximate portion of the first electrically conductive element further comprising a top surface and an end surface; and
the proximate portion of the second electrically conductive element further comprising a top surface and an end surface,
wherein the top surface of the first electrically conductive element and the top surface of the second electrically conductive element are located internal to the electrically insulative element.

12. The tilt sensor of claim 11, wherein the end surface of the first electrically conductive element and the end surface of the second electrically conductive element are located external to the electrically insulative element.

13. The tilt sensor of claim 9, wherein the distal portion of the first electrically conductive element further comprises:
a first top surface;
a first outer surface; and
a first bottom surface,
wherein the first top surface, the first outer surface, and the first bottom surface form a first cylindrical lip of the first electrically conductive element, and
wherein the distal portion of the second electrically conductive element further comprises:
a second top surface; and
a second outer surface.

14. The tilt sensor of claim 1, wherein the electrically insulative element is tube-like in shape.

15. The tilt sensor of claim 1, wherein the electrically insulative element is square-like in shape.

16. The tilt sensor of claim 1, further defined by:
the distal portion of the first electrically conductive element further comprises a cylindrical gap;
the distal portion of the second electrically conductive element further comprises an outer surface;
the first electrically conductive element further comprising a first top lip portion; and
the second electrically conductive element further comprising a second top lip portion,
wherein the first top lip portion and the second top lip portion fit over a portion of a top surface of the electrically insulative element.

17. A method of constructing a tilt sensor having a first electrically conductive element having a first diameter on a proximate portion of the first electrically conductive element and a second diameter on a distal portion of the first electrically conductive element, where the second diameter is smaller than the first diameter, a second electrically conductive element having a first diameter on a proximate portion of the second electrically conductive element and a second diameter on a distal portion of the second electrically conductive element, where the second diameter is smaller than the first diameter, an electrically insulative element, and a plurality of electrically conductive weights, wherein the distal portion of the first electrically conductive element is separated from the distal portion of the second electrically conductive element by a gap, and wherein none of the electrically conductive weights is capable of falling into the gap, the method comprising the steps of:
fitting the distal portion of the first electrically conductive element within a hollow center of the electrically insulative member;
positioning the plurality of electrically conductive weights within the hollow center of the electrically insulative member; and
fitting the distal portion of the second electrically conductive element within the hollow center of the electrically insulative member.

18. The method of claim 17, further comprising the step of fabricating a first nub on a proximate portion of the first conductive element and a second nub on a proximate portion of the second conductive element.

19. The method of claim 17, wherein the method of constructing the tilt sensor is performed in an inert gas.

20. The method of claim 17, further comprising the steps of:
sealing the first electrically conductive element to the electrically insulative element; and
sealing the second electrically conductive element to the electrically insulative element.

21. A tilt sensor, comprising:
a first electrically conductive element, having a proximate portion and a distal portion, where the distal portion of the first electrically conductive element contains a top surface, a bottom surface, and an outer surface, wherein the bottom surface of the distal portion defines an exterior portion of a gap of the distal portion, and wherein the bottom surface and the outer surface of the distal portion join at an edge;

a second electrically conductive element, having a proximate portion and a distal portion;

an electrically insulative element connected to the first electrically conductive element and the second electrically conductive element; and only one electrically conductive weight located within a cavity of the tilt sensor, wherein the cavity is defined by at least one surface of the first electrically conductive element, at least one surface of the electrically insulative element, and at least one surface of the second electrically conductive element, and wherein a distance between the outer surface of the first electrically conductive element distal portion and the distal portion of the second electrically conductive element does not allow the electrically conductive weight to fall within the distance.

22. The tilt sensor of claim 21, wherein the tilt sensor is in a closed state (ON) if a conductive path exists from the first electrically conductive element, through the electrically conductive weight, through the second electrically conductive element, and wherein the tilt sensor is in an open state (OFF) if there is no conductive path from the first electrically conductive element, to the electrically conductive weight, to the second electrically conductive element.

23. The tilt sensor of claim 21, wherein a diameter of the distal portion of the first electrically conductive element and a diameter of the distal portion of the second electrically conductive element are smaller than a diameter of the electrically insulative element.

24. The tilt sensor of claim 21, wherein:
the first electrically conductive element has a first diameter on the proximate portion of the first electrically conductive element and a second diameter on the distal portion of the first electrically conductive element, where the second diameter is smaller than the first diameter; and
the second electrically conductive element has a first diameter on the proximate portion of the second electrically conductive element and a second diameter on the distal portion of the second electrically conductive element, where the second diameter is smaller than the first diameter,
wherein the distal portion of the first electrically conductive element fits within a proximate end of the electrically insulative element, and
wherein the distal portion of the second electrically conductive element fits within a distal end of the electrically insulative element.

25. The tilt sensor of claim 24, further defined by:
the proximate portion of the first electrically conductive element further comprising a top surface and an end surface; and
the proximate portion of the second electrically conductive element further comprising a top surface and an end surface,
wherein the top surface of the first electrically conductive element and the top surface of the second electrically conductive element are located internal to the electrically insulative element.

26. The tilt sensor of claim 24, wherein the distal portion of the second electrically conductive element further comprises:
a second top surface; and
a second outer surface.

27. The tilt sensor of claim 21, further defined by:
the first electrically conductive portion further comprising a first top lip portion; and
the second electrically conductive portion further comprising a second top lip portion,
wherein the first top lip portion and the second top lip portion fit over a portion of a top surface of the electrically insulative element.

28. The tilt sensor of claim 27, wherein:
the at least one surface of the first electrically conductive element is a surface that defines the gap;
the at least one surface of the electrically insulative element is a bottom surface of the electrically insulative element; and
the at least one surface of the second electrically conductive element is the outer surface of the second distal portion.

* * * * *